Patented July 18, 1933

1,919,037

UNITED STATES PATENT OFFICE

WIRT S. QUIGLEY, OF NEW YORK, N. Y., ASSIGNOR TO QUIGLEY COMPANY, INC., A CORPORATION OF NEW YORK

CEMENTITIOUS FILLING FOR FLANGED JOINTS AND THE LIKE

No Drawing. Application filed March 11, 1931. Serial No. 521,888.

This invention comprises a cementitious filling or sealing paste, particularly useful in rendering fluid-tight the joints in systems of flanged piping, boiler caps, automobile cylinder heads, &c. and other structures many of which are subjected to high heat in use, and the physical embodiments of the invention herein described consist of composite pastes having powdered vermiculite as their principal solid constituent. With this I may use any suitable mineral filler mixed with a suitable fluid vehicle in proportions such as will produce a paste which can be evenly applied to a surface with a brush, and which will harden when heated.

The essential characteristic of the vermiculite (which is a natural mineral product in the class of hydrous silicates occurring in Colorado and in North Carolina, but more largely mined in the State of Montana) for the purposes of this invention is its capacity for expansion to nearly double its original size under heat, and the retention of the greater part of that expansion on subsequent cooling. An analysis of a typical specimen of vermiculite gives the following result, by weight:

| | |
|---|---|
| Silica | 49.08 |
| Alumina | 15.35 |
| Ferrous oxide | 16.12 |
| Calcium oxide | 1.73 |
| Magnesium oxide | 7.42 |
| Water | 10.27 |
| Vanadium | Trace |

Different specimens of vermiculite show varying compositions, but essentially they are hydrated silicates of magnesium and aluminum containing more or less iron and a relatively large percentage of water of combination, the latter sometimes running up to twenty per cent. The material is relatively brittle and the variety mined in Montana, in particular, has the property of expanding enormously when heated, sometimes forming projections which squirm about like worms as they expand, this being the reason for the name,—vermiculite. The expanded material floats on water and is nearly as light as cork. It has a low heat conductivity and is capable of resisting high temperatures. If specimens of vermiculite are ground to a fineness of 100 mesh and a given mass of such powder is subjected to rising temperatures up to about 1000 degrees Fahrenheit, such mass progressively expands to a volume about 80% greater than that which such powder possessed at room temperature. On subsequent cooling to 500 degrees Fahrenheit such mass shrinks to about 40% above the room temperature volume, but retains this volume at all lower temperatures. Such heat treatment causes a loss of about 4% in weight.

This expansion, presumably, is largely due to the effect of heat on the contained water.

In producing the form of my invention to be used when the joints in which it is employed are to be exposed to a high degree of heat, I employ as an additional mineral filler some variety of amorphous forms of carbon such as finely ground soft coal.

As a vehicle I prefer to use commercial corn syrup, which is sufficiently adhesive for the purpose of ensuring adhesion to any surface to which the compound may be applied, and is sterile, so that its physical and chemical condition is substantially unaffected by age or chemical reactions with other constituents of the paste. It also has the property of expanding under heat, thereby assisting or contributing in part to the swelling action of the mixture resulting from expansion of the vermiculite powder. The corn syrup also carbonizes under heat, thereby affording the principal ultimate setting action of this particular cement composition under the above outlined conditions of use.

A small quantity of oil may be added to the vehicle, such as sulphonated castor oil or other water-soluble form of oil, which gives the composition a certain tenacity which prevents any tendency of an applied film breaking up when being brushed on to a surface, and also prevents blistering of the surface of such film when heated.

In one method of carrying out my invention I would proceed as follows:

I take 29 parts by weight of the vermiculite ground to a fineness of about 100 mesh and 9.2 parts of powdered coal of similar degree of fineness, and thoroughly mix same by stirring with 61 parts of commercial corn syrup of a specific gravity of about 1.33 to which has been added .7 part of sulphonated castor oil of a specific gravity of about 1.05. The result is a black, viscous mass of great smoothness of texture which can be evenly applied by a brush to a metal surface to form a continuous coating thereon, of uniform thickness.

In employing my invention it is usually painted on one or both of the meeting surfaces of pipe or boiler or furnace flanges before the parts are assembled. The joint is then formed by bolting or otherwise fastening the parts together. Any spaces between the abutting faces are thus fairly well filled at the start and on the application of heat the ground vermiculite swells so as to form an absolutely gas tight joint. The corn syrup, if used, also swells and carbonizes (when a sufficient degree of heat is attained), and thus forms, with the mineral constituents, a solid, rigid filling for the joint. At the same time the powdered coal gives a slight quality of slipperiness to the meeting surfaces which prevents the parts sticking together too strongly if the joint is later taken apart. Also slight relative movements of the joint parts caused by expansion or contraction under varying temperature conditions are thus rendered possible without any resulting crumbling of the fillting body of hardened cement.

Possible changes in proportions of the constituents above recited, the omission of one or more of them, or the substitution of physical and chemical equivalents therefor, might be made without departing from the underlying principles of my invention, which comprise the suspension of a mineral substance capable of marked expansion on increase of temperature in a sterile vehicle, which latter will also facilitate setting of the mass under such increase of temperature or other drying treatment without substantial loss of body from vaporization.

Having described my invention, I claim:

1. A sealing paste for use as a filling material between the opposite surfaces of flanged joints and the like purposes of the character described comprising a mixture by weight of about 29 parts of ground vermiculite and about 61 parts of corn syrup.

2. A sealing paste for use as a filling material between the opposite surfaces of flanged joints and the like purposes of the character described comprising a mixture by weight of about 29 parts of ground vermiculite and about 61 parts of corn syrup, together with about 9 parts of powdered coal.

3. A sealing paste for use as a filling material between the opposite surfaces of flanged joints and the like purposes of the character described comprising a mixture by weight of about 29 parts of ground vermiculite and about 61 parts of a sterile vehicle which is capable of hardening when heated.

4. A sealing paste for use as a filling between the opposing surfaces of joints to be subjected to high heat comprising by weight, about 29 parts of finely ground vermiculite, and about 61 parts of a vehicle capable of expanding under heat and thereby contributing to the swelling action of the mixture from exapnsion of the vermiculite powder.

5. A sealing paste for use as a filling between the opposing surfaces of joints to be subjected to high heat comprising the suspension of finely ground vermiculite, in a condition capable of marked expansion on increase of temperature, in a sterile vehicle which will facilitate setting of the mass under such increase of temperature without substantial loss of body by vaporization.

WIRT S. QUIGLEY.